US012581267B1

(12) United States Patent
Wanta

(10) Patent No.: US 12,581,267 B1
(45) Date of Patent: Mar. 17, 2026

(54) GEOFENCE BASED ON VEHICLE TRAFFIC

(71) Applicant: Textron Inc., Providence, RI (US)

(72) Inventor: Brian David Wanta, North Augusta, SC (US)

(73) Assignee: Textron Inc., Providence, RI (US)

( * ) Notice: Subject to any disclaimer, the term of this patent is extended or adjusted under 35 U.S.C. 154(b) by 2 days.

(21) Appl. No.: 18/886,059

(22) Filed: Sep. 16, 2024

(51) Int. Cl.
*H04W 4/021* (2018.01)
*G08G 9/00* (2006.01)

(52) U.S. Cl.
CPC .............. *H04W 4/021* (2013.01); *G08G 9/00* (2013.01)

(58) Field of Classification Search
CPC ................................ H04W 4/021; G08G 9/00
See application file for complete search history.

(56) References Cited

U.S. PATENT DOCUMENTS

| | | | |
|---|---|---|---|
| 6,304,211 B1 * | 10/2001 | Boman .............. | A63B 24/0021 |
| | | | 701/470 |
| 7,999,670 B2 | 8/2011 | Mcclellan et al. | |
| 8,653,956 B2 | 2/2014 | Berkobin et al. | |
| 9,280,902 B2 | 3/2016 | Silzer, Sr. et al. | |
| 9,313,616 B2 | 4/2016 | Mitchell et al. | |
| 9,378,480 B2 | 6/2016 | Morgan et al. | |
| 9,691,284 B2 | 6/2017 | Morgan et al. | |
| 10,152,679 B2 | 12/2018 | Burtner et al. | |
| 10,685,509 B2 | 6/2020 | Mcquade et al. | |
| 10,890,119 B2 | 1/2021 | Fletcher | |

| | | | |
|---|---|---|---|
| 2003/0060938 A1 | 3/2003 | Duvall | |
| 2004/0260467 A1 * | 12/2004 | Wehrlen .............. | G05D 1/0282 |
| | | | 701/36 |
| 2008/0039991 A1 * | 2/2008 | May ..................... | G05D 1/0278 |
| | | | 701/25 |
| 2011/0230165 A1 | 9/2011 | Kleve et al. | |
| 2012/0146810 A1 | 6/2012 | Olsen et al. | |
| 2012/0242470 A1 | 9/2012 | Morgan et al. | |
| 2012/0242511 A1 | 9/2012 | Morgan et al. | |
| 2012/0259537 A1 | 10/2012 | Schmidt et al. | |
| 2013/0021174 A1 * | 1/2013 | Silzer, Sr. ............ | G05D 1/0278 |
| | | | 701/34.4 |
| 2015/0081212 A1 | 3/2015 | Mitchell et al. | |
| 2016/0049014 A1 | 2/2016 | Wells et al. | |
| 2016/0180721 A1 | 6/2016 | Otulic | |

(Continued)

FOREIGN PATENT DOCUMENTS

JP         2003296889 A   * 10/2003

*Primary Examiner* — Chico A Foxx
(74) *Attorney, Agent, or Firm* — FOLEY & LARDNER LLP

(57)         ABSTRACT

A golf course traffic management system includes one or more processing circuits configured to monitor a location of a plurality of golf vehicles relative to a respective area, establish a restricted operation area around a first area or a second area of the respective area, permit unrestricted operation of a respective golf vehicle of the plurality of golf vehicles when the location indicates that the respective golf vehicle is located outside of the restricted operation area, limit operation of the respective golf vehicle when the location indicates that the respective golf vehicle is located in the restricted operation area, and automatically transition between establishing the restricted operation area around the first area and around the second area to dynamically adjust a traffic pattern within the respective area.

20 Claims, 5 Drawing Sheets

(56)  References Cited

U.S. PATENT DOCUMENTS

| | | | |
|---|---|---|---|
| 2019/0299073 A1* | 10/2019 | Vollbrecht | ............. G06V 20/52 |
| 2019/0357005 A1 | 11/2019 | Brady | |
| 2020/0108843 A1 | 4/2020 | Hunt | |
| 2021/0103292 A1 | 4/2021 | O'Hara et al. | |
| 2021/0157015 A1 | 5/2021 | Czarnecky et al. | |
| 2022/0083921 A1* | 3/2022 | Brkic | ................ G06Q 30/0241 |
| 2022/0306073 A1 | 9/2022 | King | |
| 2023/0053199 A1 | 2/2023 | Goodnight et al. | |
| 2024/0061129 A1 | 2/2024 | Boehm | |
| 2024/0303565 A1* | 9/2024 | Tran | ................ G06Q 10/06313 |

* cited by examiner

GEOFENCE BASED ON VEHICLE TRAFFIC

BACKGROUND

Golf carts are commonly used by golfers while playing a round of golf to drive between holes, to their ball, and to carry their bags. Other vehicles, such as drink carts, ground maintenance vehicles, recreational vehicles, utility vehicles, etc. are also commonly found at a golf course. Keep-out geofences may be established around areas of the golf course where the golf carts and other vehicles should not drive. These areas may include greens, tee boxes, buildings, water, woods, heavily trafficked areas, among others. When the golf cart or the other vehicles drive in the area defined by the keep-out geofence, the operation thereof may be limited.

SUMMARY

One embodiment relates to a golf course traffic management system. The golf course traffic management system includes one or more processing circuits configured to monitor a location of a plurality of golf vehicles relative to a respective area, establish a restricted operation area around a first area or a second area of the respective area, permit unrestricted operation of a respective golf vehicle of the plurality of golf vehicles when the location indicates that the respective golf vehicle is located outside of the restricted operation area, limit operation of the respective golf vehicle when the location indicates that the respective golf vehicle is located in the restricted operation area, and automatically transition between establishing the restricted operation area around the first area and around the second area to dynamically adjust a traffic pattern within the respective area.

Another embodiment relates to a golf course traffic management system. The golf course traffic management system includes one or more processing circuits configured to monitor a location of a plurality of golf vehicles relative to a respective area, store location data associated with the location of the plurality of golf vehicles, determine, based on the location data, a traffic concentration value associated with the respective area, establish a restricted operation area around the respective area responsive to the traffic concentration value exceeding a traffic concentration value threshold, permit unrestricted operation of a respective golf vehicle when the location indicates that the respective golf vehicle is located outside of the restricted operation area, and limit operation of the respective golf vehicle when the location indicates that the respective golf vehicle is located in the restricted operation area. The traffic concentration value includes a predetermined number of instances the plurality of golf vehicles have operated in the respective area within a predetermined amount of time.

Still another embodiment relates to a golf course traffic management system. The golf course traffic management system includes one or more processing circuits configured to establish a restricted operation area around a first area or a second area of a respective area, monitor a location of a golf vehicle relative to the respective area, permit unrestricted operation of the golf vehicle when the location indicates that the golf vehicle is located outside of the restricted operation area, limit operation of the golf vehicle when the location indicates that the golf vehicle is located in the restricted operation area, and automatically transition between establishing the restricted operation area around the first area and around the second area responsive to an elapsed time exceeding an elapsed time threshold to dynamically adjust a traffic pattern within the respective area.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
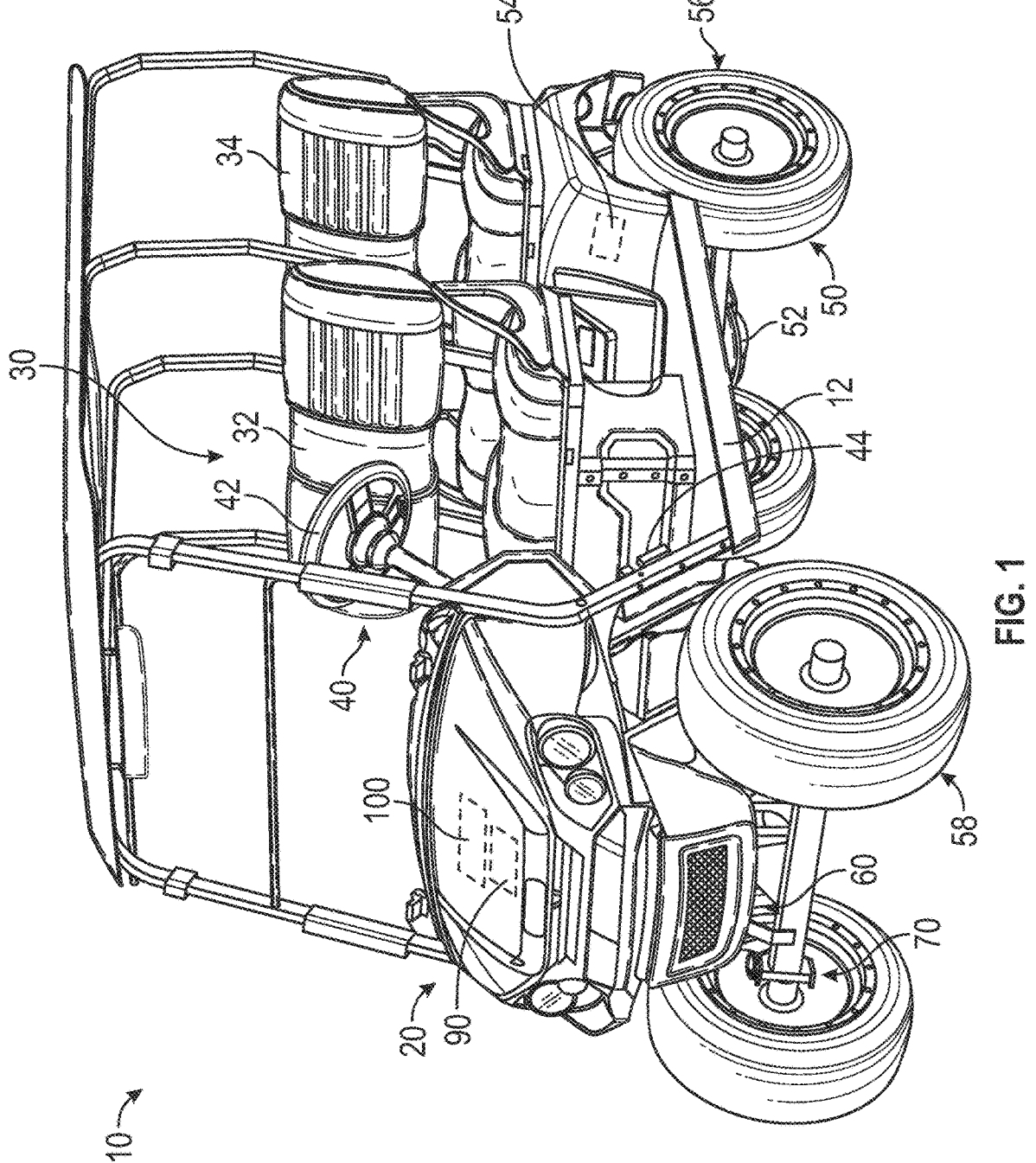
FIG. 1 is a perspective view of a vehicle, according to an exemplary embodiment.
Figure 2:
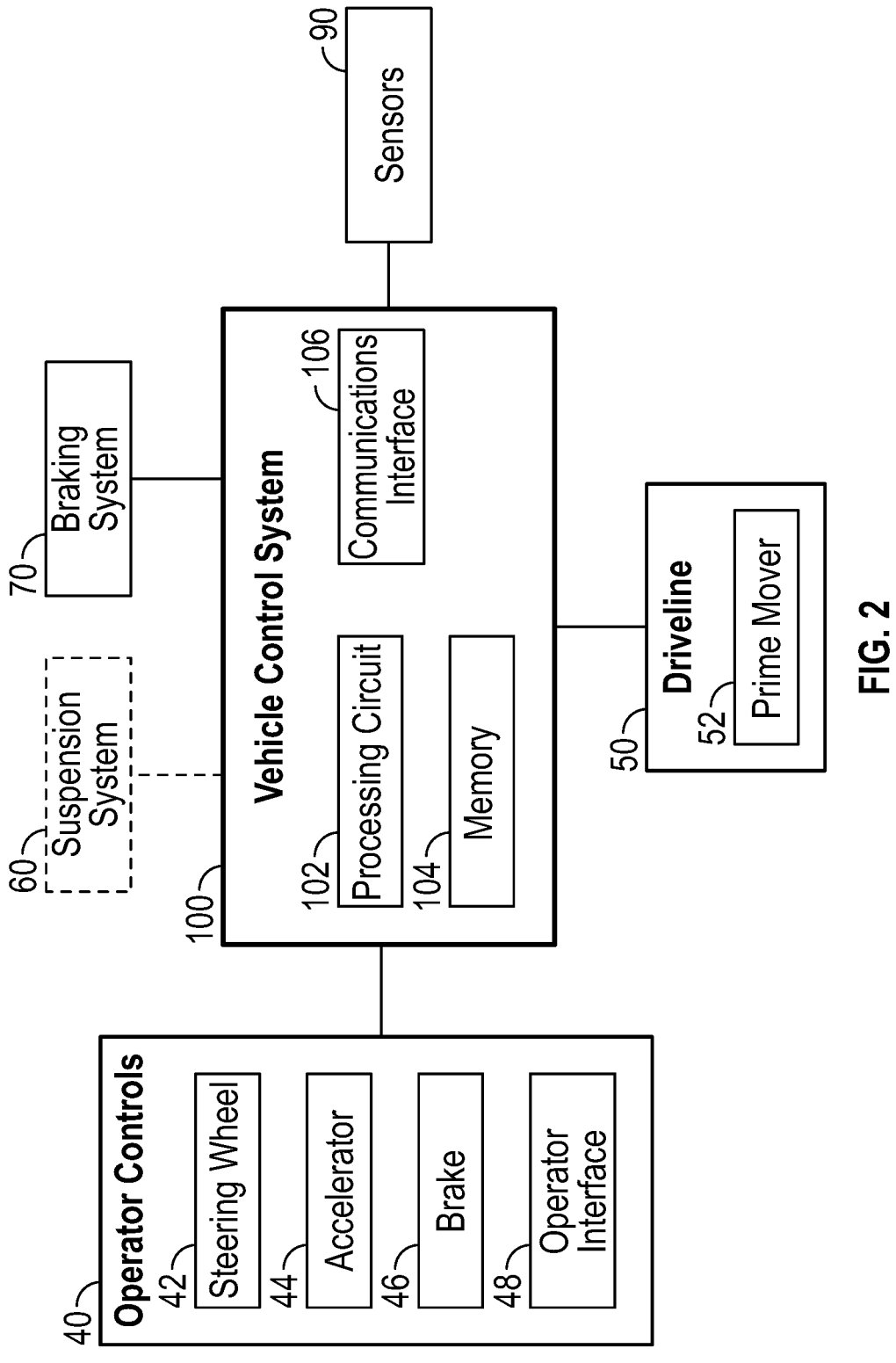
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), a low speed vehicle ("LSV"), a personal transport vehicle ("PTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, electric regenerative braking is employed (e.g., via the prime mover 52, an electric motor, etc.) in combination with or instead of using the braking system 70 to facilitate braking of one or more components of the driveline 50.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a prox-imity detection sensor, a Doppler sensor, and/or other sen-sors to facilitate acquiring vehicle information or vehicle data regarding operation of the vehicle 10 and/or the loca-tion thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of com-ponents of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), cir-cuits containing one or more processing components, cir-cuitry for supporting a microprocessor, a group of process-ing components, or other suitable electronic processing components. According to the exemplary embodiment shown in FIG. 2, the vehicle control system 100 includes a processing circuit 102, a memory 104, and a communica-tions interface 106. The processing circuit 102 may include an ASIC, one or more FPGAs, a DSP, circuits containing one or more processing components, circuitry for supporting a microprocessor, a group of processing components, or other suitable electronic processing components. In some embodi-ments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execu-tion by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, con-trol, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Site Monitoring and Control System

Figure 3:
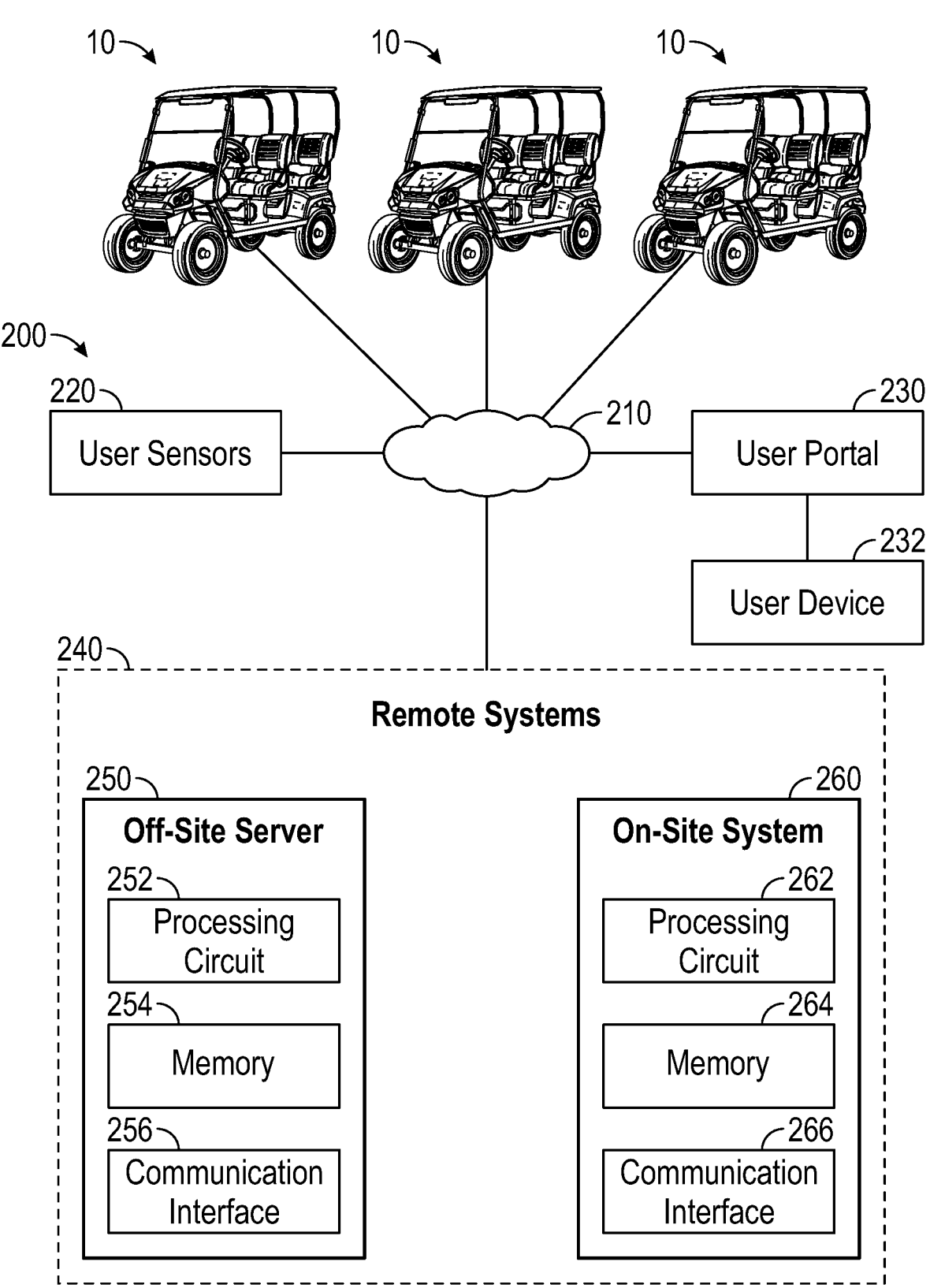
FIG. 3 is a schematic block diagram of a site monitoring and control system including a plurality of the vehicles of FIG. 1, according to an exemplary embodiment.

As shown in FIG. 3, a monitoring and control system, shown as site monitoring and control system 200, includes one or more vehicles 10; one or more second sensors, shown as user sensors 220, positioned remote or separate from the vehicles 10; an operator interface, shown as user portal 230, positioned remote or separate from the vehicles 10; an external or remote user device, shown as user device 232, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210. In some embodiments, the site monitoring and control system 200 does not includes the user portal 230 and/or the user device 232.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, a heart rate monitor, etc.) and/or a sensor that is otherwise carried by the operator (e.g., a smartphone, etc.) that facilitates acquiring and monitoring operator data (e.g., physiological conditions such a tempera-ture, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermedi-ary).

The user portal 230 may be configured to facilitate operator access to dashboards including the vehicle data, the operator data, information available at the remote systems 240, etc. to manage and operate the site (e.g., golf course) such as for advanced scheduling purposes, to identify per-sons breaking course guidelines or rules, to monitor loca-tions of the vehicles 10, etc. The user portal 230 may also be configured to facilitate operator implementation of configu-rations and/or parameters for the vehicles 10 and/or the site (e.g., setting speed limits, setting geofences, etc.). As shown in FIG. 3, the user portal 230 is accessible via the user device 232. The user device 232 may be or include a computer, laptop, smartphone, tablet, or the like. The user portal 230 and the user device 232 may communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230.

As shown in FIG. 3, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle control systems 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Dynamic Geofence

It should be understood that any of the functions or processes described herein with respect to the site monitoring and control system 200 may be performed by the vehicle control system 100 and/or the remote systems 240. By way of example, data collection may be performed by the vehicle control system 100 and data analytics may be performed by the vehicle control system 100. By way of another example, data collection may be performed by the vehicle control system 100 and data analytics may be performed by the remote systems 240. By way of yet another example, data collection may be performed by the vehicle control system 100, a first portion of data analytics may be performed by the vehicle control system 100, and a second portion of data analytics may be performed by the remote systems 240. By way of still another example, a first portion of data collection may be performed by the vehicle control system 100, a second portion of data collection may be performed by the remote systems 240, and data analytics may be performed by the vehicle control system 100 and/or the remote systems 240.

Figure 4:
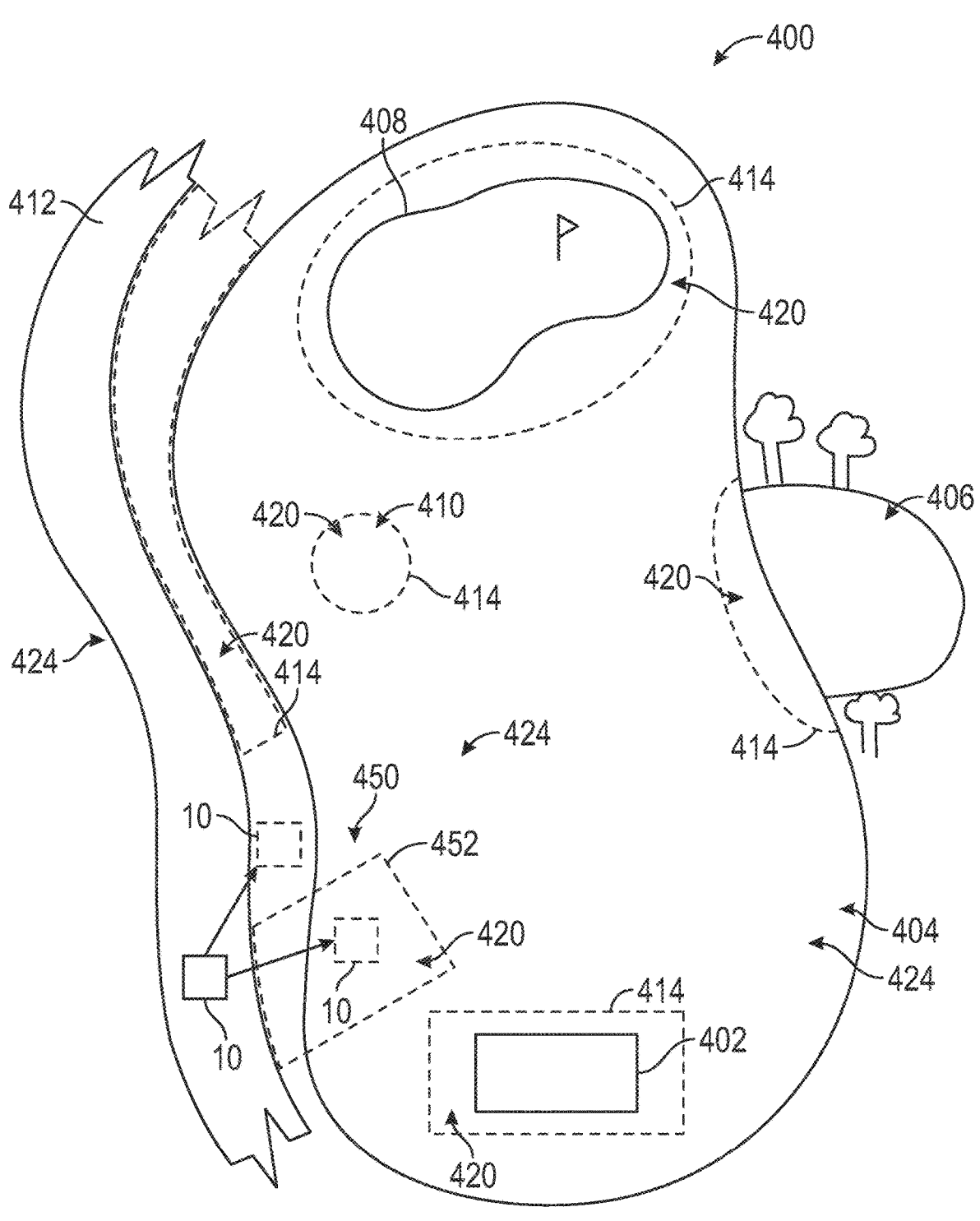
FIG. 4 is a top view of a golf course including the vehicle of FIG. 1 and a plurality of geofences, according to an exemplary embodiment.
Figure 5:
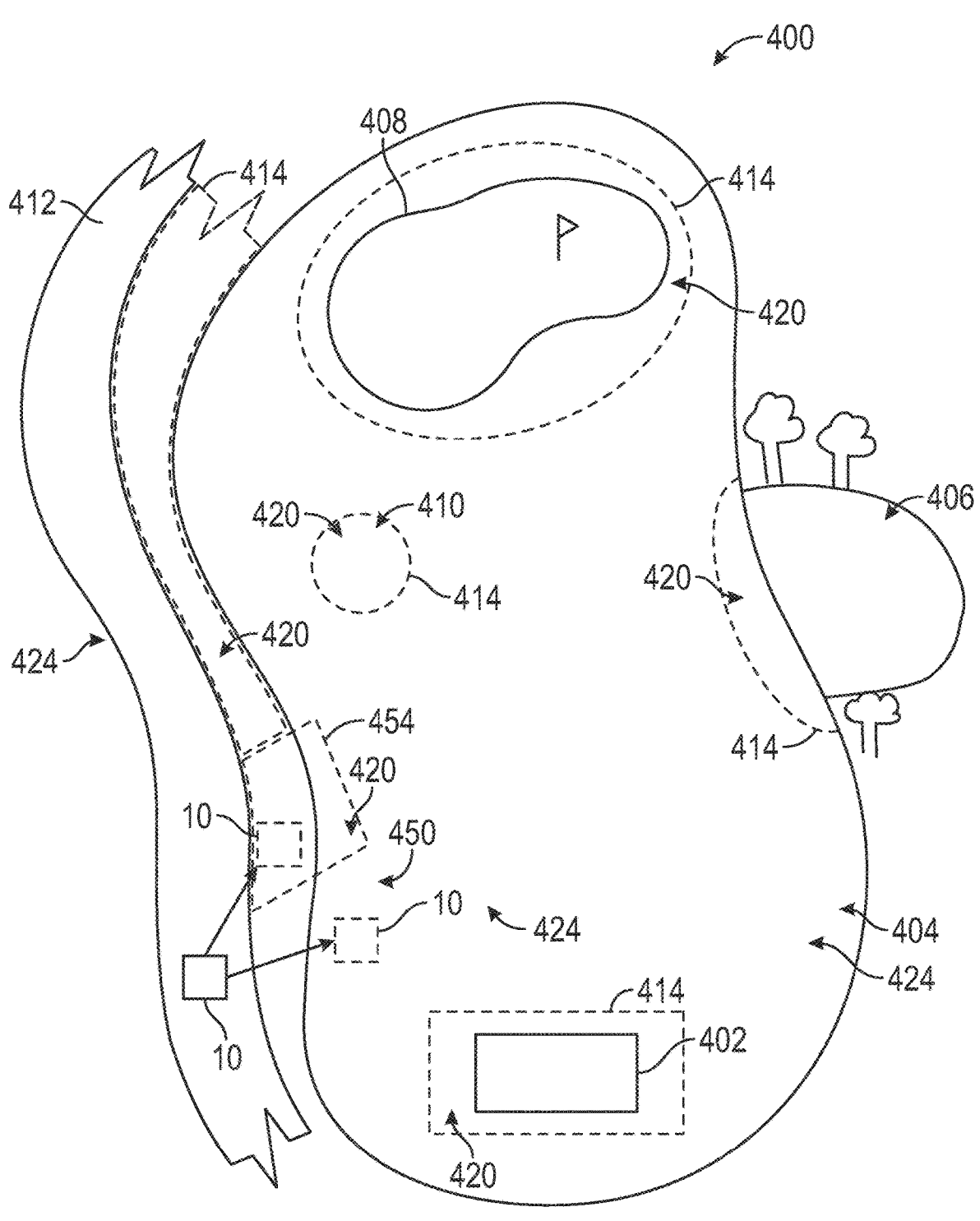
FIG. 5 is a top view of a golf course including the vehicle of FIG. 1 and a plurality of geofences, according to an exemplary embodiment.

As shown in FIGS. 4 and 5, the vehicle 10 is a golf cart driven by an operator playing golf on a golf course 400. In some embodiments, the vehicle 10 is a drink cart, a cart driven by an employee of the golf course 400 (e.g., monitoring the pace of play of golfers), a cart driven by the maintenance crew working at the golf course 400, or another type of vehicle or vehicle commonly found at golf courses (e.g., a turf mower, a sprayer, an aerator, a bunker rake, etc.). A hole of the golf course 400 is shown including a tee box 402; a fairway 404; a water hazard, woods, fescue, etc., shown as out-of-bounds area 406; a putting green, shown as green 408; an area in the fairway 404 that is under repair, a non-playable area, etc., shown as hazard 410; and a path, a trail, a cart route, etc., shown as cart path 412.

The golf course 400 includes areas that should not be driven on, in, or around by the vehicle 10. By way of example, these areas may include the tee box 402, the out-of-bounds area 406, the fairway 404 during certain conditions (e.g., rain, flooding, under repair, etc.), the green 408, the hazard 410, private property along the golf course 400, a club house of the golf course 400, and/or another area of the golf course 400. Driving on, in, or around these areas by the vehicle 10 may damage the golf course 400, be dangerous for an operator of the vehicle 10, damage the vehicle 10, be illegal (e.g., trespassing on private property), etc. Collectively, these areas are hereinafter referred to as restricted areas 420. Accordingly, one or more geofences (e.g., a virtual boundary, a virtual fence, etc.), shown as geofences 414, may be established around the restricted areas 420. The geofences 414 may be areas or boundaries defined around the restricted areas 420 to control and manage the operation of the vehicle 10 on the golf course 400. By way of example, when the vehicle 10 is driven beyond the virtual boundary of the geofence 414 (i.e., driven into a restricted area 420), the operation of the prime mover 52 of the vehicle 10 may be limited (e.g., limit speeds below 5 miles per hour, prevent forward travel of the vehicle 10, limit the vehicle 10 to backward travel only, disabled, limited or restricted operation, etc.). Areas of the golf course 400, such as the cart path 412, a parking lot of the golf course 400, portions of the fairway 404, a cart return area, etc. that are not restricted areas 420 (e.g., areas outside of the restricted areas 420) defined by a geofence 414 may be drivable (e.g., navigable, permitted, unrestricted operation, etc.) by the vehicle 10, and are hereinafter referred to as the drivable areas 424.

According to an exemplary embodiment, a location of the vehicle 10 is monitored by the site monitoring and control system 200 to determine the location of the vehicle 10 relative to the geofences 414, the restricted areas 420, and the drivable areas 424. The location of the vehicle 10 may be determined based on GPS data (e.g., collected by the sensors 90 and/or the user sensors 220). The site monitoring and control system 200 may be configured to store the location data and analyze the location data to make operational decisions based thereon. By way of example, the site monitoring and control system 200 may be configured to control operation of the vehicle 10 based on the real-time location data, control operation of the vehicle 10 based on a history of the location data (e.g., based on one or more patterns in the location data determined over time), control operation of a fleet of the vehicles 10 based on the history of the location data, etc.

In some embodiments, a true location (e.g., real-time position, actual location, etc.) of the vehicle 10 is different than a tracked location of the vehicle 10 determined based on the GPS data. The error or difference between the tracked location of the vehicle 10 and the true location of the vehicle 10 may be caused by signal interference (e.g., geomagnetic radiation), solar storms, signal obstruction (e.g., tree cover, building cover, etc.), weather (e.g., rain, snow, pressure, etc.), control system quality, malfunctioning sensors, and/or any other combination of internal hardware or external factors. The difference between the tracked location and the true location may be referred to herein as location or GPS drift. Because of the difference between the tracked location and the true location, the site monitoring and control system 200 may determine, based on the GPS position, that the vehicle 10 is operating in the restricted area 420 (e.g., near/on a green or tee box, near/on a hazard such as ground under repair, an area defined by a geofence, a non-drivable area, etc.) when in reality, the true location of the vehicle 10 is not in the restricted area 420. In such an example, the site monitoring and control system 200 may undesirably limit the operation of the vehicle 10. Similarly, because of the difference between the tracked location and the true location, the site monitoring and control system 200 may determine, based on the GPS position, that the vehicle 10 is not operating in the restricted area 420 (e.g., operating in the drivable area 424) when in reality, the true location of the vehicle 10 is in the restricted area 420. In such an example, the site monitoring and control system 200 may undesirably permit operation of the vehicle 10 within the restricted area 420.

According to an exemplary embodiment, the site monitoring and control system 200 is configured to correct (e.g., adjust for, account for, etc.) the undesirable controlling of the operation of the vehicles 10 as a result of the GPS drift. By way of example, the site monitoring and control system 200 may be configured to force the tracked location to be within the drivable area 424 in response to a determination, based on the true location, that the vehicle 10 is traveling in the drivable area 424 and the tracked location indicates that the vehicle 10 is in the restricted area 420. By way of another example, the site monitoring and control system 200 may be configured to force the tracked location to be within the restricted area 420 in response to a determination, based on the true location, that the vehicle 10 is traveling in the restricted area 420 and the tracked location indicates that the vehicle 10 is in the drivable area 424. By way of another example, the site monitoring and control system 200 may be configured to control operation of the vehicle 10 based on a corrective position determined using RTK information. In such an example, the corrective position may be based on corrective position data determined based on (i) communications between the on-site system 260 and a satellite (e.g., a global navigation satellite system (GNSS) satellite) and (ii) a known, fixed location of the on-site system 260. By way of yet another example, the site monitoring and control system 200 may be configured to control operation of the vehicle 10 based on the type of surface the vehicle 10 is driving on. In some embodiments, when a determination is made that the true location is different than the tracked location (e.g., the coordinates are different), the site monitoring and control system 200 may be configured to recalibrate (e.g., reset) the sensors 90 collecting the GPS data and/or send a signal commanding the user sensors 220 to recalibrate.

The site monitoring and control system 200 may control an operation of the operator controls 40, the driveline 50, the suspension system 60, the braking system 70, and/or any other component of the vehicle 10 based on the true location (e.g., a corrected position, an actual location, etc.) of the vehicle 10 relative to the restricted areas 420 and the drivable areas 424. By way of example, the site monitoring and control system 200 may determine, based on the true location, that the vehicle 10 is operating (e.g., driving forward, driving backward, idling, stopped, parked, etc.) (i) in a drivable area 424 defined by a respective geofence 414, (ii) near a respective geofence 414 (e.g., within 5 yards of the respective geofence 414, within 10 yards of the respective geofence 414, etc.), or (iii) in a restricted area 420 defined by a respective geofence 414. In response to a determination that the vehicle 10 is operating in a drivable area 424, the site monitoring and control system 200 may facilitate (e.g., permit operation of the vehicle 10 in a first mode of operation) normal or unrestricted operation of the operator controls 40, the driveline 50, the suspension system 60, the braking system 70, and/or any other component of the vehicle 10. In response to a determination that the vehicle 10 is operating in or near a restricted area 420 (e.g., near or in the geofence 414), the site monitoring and control system 200 may (i) limit operation (e.g., limit operation of the vehicle 10 in a second mode of operation) of the operator controls 40, the driveline 50, the suspension system 60, the braking system 70, and/or any other component of the vehicle 10 and/or (ii) provide an alert (e.g., visually or audibly via the operator interface 48, in a tactile manner by shaking the steering wheel 42, etc.) to the operator of the vehicle 10 indicative of the location of the restricted area 420 (e.g., a boundary of the geofence 414). By way of example, the site monitoring and control system 200 may limit operation of the prime mover 52 such that the vehicle 10 (i) cannot exceed a threshold speed (e.g., 5 miles per hour, 2 miles per hour, etc.), (ii) is limited to rearward travel, and/or (iii) any other control to limit operation of the vehicle 10. In such an example, to transition the vehicle 10 to the second mode of operation, the site monitoring and control system 200 may (i) shift the vehicle 10 into neutral (e.g., such that no power is transmitted to the prime mover 52) and/or (ii) operate the braking system 70 to slow the vehicle 10 to a stop. The vehicle 10 may be limited to the second mode of operation until the vehicle 10 navigates (e.g., is navigated by an operator) to the drivable area 424.

As shown in FIGS. 4 and 5, the golf course 400 includes a commonly used area, shown as heavy traffic area 450, that the vehicles 10 commonly travel on to enter the fairway 404 from the cart path 412. Generally, the heavy traffic area 450 includes one or more areas of the fairway 404 where it is common (e.g., typical) for vehicles 10 enter the fairway 404 from the cart path 412 and thus experience greater amounts of vehicle traffic compared to that experienced by other areas of the fairway 404 or golf course 400. The heavy traffic area 450 may be located past the tec box 402 and where the fairway 404 starts (e.g., at an access point to the fairway 404). In some embodiments, the heavy traffic area 450 is otherwise located about the golf course 400 at an area where vehicles 10 typically leave the cart path 412. By way of example, the operator of the vehicle 10 may control the vehicle 10 to leave the cart path 412 and enter the fairway 404 at the heavy traffic area 450 to navigate to where their ball landed. Repeated vehicle traffic in the same area (e.g., in the heavy traffic area 450) may compact the soil, making it harder for grass to grow and for water to penetrate, which may cause turf damage (e.g., dead grass, the formation of ruts, etc.).

As shown in FIGS. 4 and 5, the heavy traffic area 450 includes a first area (e.g., a first half, a first portion, etc.) defined by a first traffic geofence 452 and a second area (e.g., a second half, a second portion, etc.) defined by a second traffic geofence 454. In some embodiments, the first traffic geofence 452 and the second traffic geofence 454 are keep-out geofences such as the geofences 414 established around hazards and other non-drivable areas. In some embodiments, the heavy traffic area 450 includes more or fewer areas defined by more or fewer traffic geofences than the first traffic geofence 452 and the second traffic geofence 454 (e.g., one, three, four, etc. traffic geofences). As shown in FIGS. 4 and 5, the first traffic geofence 452 and the second traffic geofence 454 each define a restricted area 420. Responsive to a determination by the site monitoring and control system 200 that the vehicle 10 is operating within the restricted area 420 defined by the first traffic geofence 452 and/or the second traffic geofence 454, the site monitoring and control system 200 may limit operation of the vehicle 10 to the first mode of operation to prevent the vehicle 10 from continuing within the restricted area 420.

According to an exemplary embodiment, the site monitoring and control system 200 is configured to transition between activating the first traffic geofence 452 and the second traffic geofence 454. By way of example, when the first traffic geofence 452 is established or activated (e.g., when the first traffic geofence 452 is actively defining a restricted area 420), the site monitoring and control system 200 may remove or deactivate the second traffic geofence 454 such that operation of the vehicle 10 is (i) limited to the first mode of operation when the vehicle 10 enters the first area of the heavy traffic area 450 associated with the first traffic geofence 452 and (ii) permitted in the second mode of operation when the vehicle 10 enters the second area of the heavy traffic area 450 associated with the second traffic geofence 454. By way of another example, when the second traffic geofence 454 is established or activated (e.g., when the second traffic geofence 454 is actively defining a restricted area 420), the site monitoring and control system 200 may remove or deactivate the first traffic geofence 452 such that operation of the vehicle 10 is (i) limited to the first mode of operation when the vehicle 10 enters the second area of the heavy traffic area 450 associated with the second traffic geofence 454 and (ii) permitted in the second mode of operation when the vehicle 10 enters the first area of the heavy traffic area 450 associated with the first traffic geofence 452.

The site monitoring and control system 200 is configured to selectively activate or deactivate (e.g., establish or remove) the first traffic geofence 452 and the second traffic geofence 454 to facilitate directing a flow of traffic of the vehicle 10 or a fleet of the vehicles 10. In other words, the site monitoring and control system 200 selectively transitions (i) the first area between a restricted area 420 and a drivable area 424 and (ii) the second area between a restricted area 420 and a drivable area 424 to facilitate directing the flow of traffic of one or more of the vehicles 10. The site monitoring and control system 200 may be configured to determine an area condition value (e.g., a traffic concentration value, a turf compaction value, an elapsed time, etc.) associated with the heavy traffic area 450 (e.g., with the first area and the second area, by monitoring positions and travel paths of the vehicle 10 over time, etc.) and may selectively activate or deactivate the first traffic geofence 452 and the second traffic geofence 454 based on the area condition value. In some embodiments, the site monitoring and control system 200 is configured to selectively activate or deactivate the first traffic geofence 452 and the second traffic geofence 454 based on one or more other factors such as a degree of compaction of the turf (e.g., an amount the soil has been compacted affecting the ability of the area to grow vegetation), a quality of the turf (e.g., one or more hazards, ruts, etc. in the turf), sensitive vegetation (e.g., newly planted grass, flowers, seeds, etc.), or the like associated with the heavy traffic area 450.

In some embodiments, the area condition value includes a traffic condition value determined based on the history of the location data associated with the heavy traffic area 450. In such embodiments, the traffic condition value is determined based on the number of instances a vehicle 10 has operated within (e.g., driven through, entered, etc.) the first area and/or the second area of the heavy traffic area 450 based on the location data within a predetermined timeframe (e.g., within one hour, within one day, within one week, etc.). The site monitoring and control system 200 is configured to selectively activate or deactivate the first traffic geofence 452 and the second traffic geofence 454 in response to the traffic condition value exceeding a traffic condition value threshold (e.g., in response to the area condition value exceeding an area condition value threshold).

By way of example, as shown in FIG. 5, when the second traffic geofence 454 is active and the first traffic geofence 452 is not active (e.g., such that the second area is a restricted area 420 and the first area is a drivable area 424), if the number of instances a vehicle 10 has operated within the first area within the predetermined timeframe exceeds a threshold number of instances, the site monitoring and control system 200 determines that the traffic condition value has exceeded the traffic condition value threshold and (i) activates the first traffic geofence 452 and (ii) deactivates the second traffic geofence 454 such that the first area becomes a restricted area 420 and the second area becomes a drivable area 424, as shown in FIG. 4. In such an example, transitioning the restricted area 420 from being established around the second area by the second traffic geofence 454 to being established around the first area by the first traffic geofence 452 facilitates re-routing a traffic pattern within the heavy traffic area 450 from the first area to the second area.

By way of another example, as shown in FIG. 4, when the first traffic geofence 452 is active and the second traffic geofence 454 is not active (e.g., such that the first area is a restricted area 420 and the second area is a drivable area 424), if the number of instances a vehicle 10 has operated within the second area within the predetermined timeframe exceeds a threshold number of instances, the site monitoring and control system 200 determines that the traffic condition value has exceeded the traffic condition value threshold and (i) activates the second traffic geofence 454 and (ii) deactivates the first traffic geofence 452 such that the second area becomes a restricted area 420 and the first area becomes a drivable area 424, as shown in FIG. 5. In such an example, transitioning the restricted area 420 from being established around the first area by the first traffic geofence 452 to being established around the second area by the second traffic geofence 454 facilitates re-routing a traffic pattern within the heavy traffic area 450 from the second area to the first area.

In some embodiments, the predetermined timeframe used to determine the traffic condition value and/or the traffic condition value threshold varies depending on one or more conditions such as the weather. By way of example, the predetermined timeframe may be less and/or the traffic condition value threshold may be lower during poor weather conditions (e.g., while it is raining or after it has rained, rained more than 1 inch in a 24 hour period, after a rain event, etc.) such that the restricted area 420 is transitioned between being established around the first area by the first geofence 452 and being established around the second area by the second geofence 454 more often than during or after normal weather conditions (e.g., non-rainy weather conditions).

In some embodiments, the area condition value additionally or alternatively includes an elapsed time such that the site monitoring and control system 200 is configured to selectively activate or deactivate the first traffic geofence 452 and the second traffic geofence 454 in response to the elapsed time exceeding an elapsed time threshold (e.g., in response to the area condition value exceeding an area condition value threshold, without having to actively monitor vehicle traffic, etc.). In some embodiments, the elapsed time threshold is used in combination with the traffic condition value threshold, and the traffic geofences (e.g., the first traffic geofence 452, the second traffic geofence 454, etc.) are activated/deactivated based on one or both of the thresholds being exceeded.

By way of example, as shown in FIG. 5, when the second traffic geofence 454 is active and the first traffic geofence 452 is not active such that the second area is a restricted area 420 and the first area is a drivable area 424, if the elapsed time exceeds the elapsed time threshold, the site monitoring and control system 200 activates the first traffic geofence 452 and deactivates the second traffic geofence 454 such that the first area becomes a restricted area 420 and the second area becomes a drivable area 424, as shown in FIG. 4. In such an example, transitioning the restricted area 420 from being established around the second area by the second traffic geofence 454 to being established around the first area by the first traffic geofence 452 facilitates re-routing a traffic pattern within the heavy traffic area 450 from the first area to the second area.

By way of another example, as shown in FIG. 4, when the first traffic geofence 452 is active and the second traffic geofence 454 is not active (e.g., such that the first area is a restricted area 420 and the second area is a drivable area 424), if the elapsed time exceeds the elapsed time threshold, the site monitoring and control system 200 activates the second traffic geofence 454 and deactivates the first traffic geofence 452 such that the second area becomes a restricted area 420 and the first area becomes a drivable area 424, as shown in FIG. 5. In such an example, transitioning the restricted area 420 from being established around the first area by the first traffic geofence 452 to being established around the second area by the second traffic geofence 454 facilitates re-routing a traffic pattern within the heavy traffic area 450 from the second area to the first area.

The length of the elapsed time may be one hour, one day, one week, etc., such that the site monitoring and control system 200 transitions the restricted area 420 between being established around the first area by the first traffic geofence 452 and being established around the second area by the second traffic geofence 454 every hour, every day, every week, etc., respectively. In some embodiments, the length of the elapsed time is based on a time of day, a day of the week, a season of the year, or the like. By way of example, during times of the day or seasons that the golf course 400 is busy (e.g., during the middle of the day compared to twilight hours, during the summer compared to during the winter, etc.), the elapsed time may be less (e.g., shorter) such that the restricted area 420 is transitioned between being established around the first area by the first traffic geofence 452 and being established around the second area by the second traffic geofence 454 more often than during less busy times. In some embodiments, the length of the elapsed time is based on the weather. By way of example, the length of the elapsed time may be less while it is raining or after it has rained such that the restricted area 420 is transitioned between being established around the first area by the first traffic geofence 452 and being established around the second area by the second traffic geofence 454 more often than during or after non-rainy weather conditions.

Selectively transitioning the restricted area 420 between being established around the first area by the first traffic geofence 452 and being established around the second area by the second traffic geofence 454 facilitates re-routing a traffic pattern within the heavy traffic area 450 to a desired traffic pattern. Traditional golf courses typically require a user (e.g., an employee, a groundkeeper, etc.) to place ropes and stakes, and periodically change the location of the ropes and stakes to change a traffic pattern of vehicles. The present disclosure provides for automatically establishing a desired traffic pattern and changing the traffic pattern (e.g., changing a location of the where the vehicle 10 may leave the cart path 412 without limiting operation thereof to the first mode of operation) by the site monitoring and control system 200 based on the traffic density, an elapsed time, etc. by selectively activating or deactivating the first traffic geofence 452 and the second traffic geofence 454. Such traffic control aids in reducing soil compaction, dead grass, the formation of ruts, etc. throughout the golf course 400, without requiring a user to manually set up course-rerouting blockers in such areas to influence traffic patterns.

According to an exemplary embodiment, in response to a determination by the site monitoring and control system 200 that the vehicle 10 is operating in the drivable area 424 (e.g., on the cart path 412), but approaching the restricted area 420 defined by the first traffic geofence 452 or the second traffic geofence 454 within a threshold distance (e.g., 1 yard, 5 yards, 10 yards, etc.), the site monitoring and control system 200 provides an indication (e.g., visually via the operator interface 48) to the operator of the vehicle 10 regarding the location of the restricted area 420 (e.g., a boundary of the first traffic geofence 452 or the second traffic geofence 454). By way of example, when the vehicle 10 is driving near the restricted area 420 defined by the first traffic geofence 452 or the second traffic geofence 454 (e.g., approaching the heavy traffic area 450), the operator interface 48 may display a graphical representation of the first traffic geofence 452 or the second traffic geofence 454 so that the operator is aware of the restricted area 420 and can navigate the vehicle 10 to avoid the restricted area 420 (e.g., stay within the drivable areas 424) as they enter the heavy traffic area 450.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) and the site monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:

1. A golf course traffic management system comprising:
   one or more processing circuits configured to:
      monitor a location of a plurality of golf vehicles relative to a respective area;
      establish a restricted operation area around a first area or a second area of the respective area;
      permit unrestricted operation of a respective golf vehicle of the plurality of golf vehicles when the location indicates that the respective golf vehicle is located outside of the restricted operation area;
      limit operation of the respective golf vehicle when the location indicates that the respective golf vehicle is located in the restricted operation area; and
   automatically transition between establishing the restricted operation area around the first area and around the second area to dynamically adjust a traffic pattern within the respective area.

2. The golf course traffic management system of claim 1, wherein the one or more processing circuits are configured to:
   determine an area condition value associated with the first area or the second area; and transition the restricted operation area from being established around the first area or the second area to being established around the other one of the first area or the second area when the area condition value exceeds an area condition value threshold.

3. The golf course traffic management system of claim 2, wherein the area condition value includes a predetermined number of instances the plurality of golf vehicles have operated in the respective area within a predetermined amount of time.

4. The golf course traffic management system of claim 2, wherein the area condition value includes an elapsed time and the area condition value threshold includes an elapsed time threshold.

5. The golf course traffic management system of claim 2, wherein the area condition value or the area condition value threshold is determined based on a time of day or a season such that the restricted operation area is transitioned between being established around the first area and being established around the second area more often during busy times of the day or busy seasons.

6. The golf course traffic management system of claim 2, wherein the area condition value or the area condition value threshold is determined based on a weather condition such that the restricted operation area is transitioned between being established around the first area and being established around the second area more often during or after poor weather conditions.

7. The golf course traffic management system of claim 1, wherein the first area is defined by a first geofence and the second area is defined by a second geofence.

8. The golf course traffic management system of claim 7, wherein the one or more processing circuits are configured to selectively activate or deactivate the first geofence or the second geofence to transition between the restricted operation area being established around the first area and being established around the second area.

9. The golf course traffic management system of claim 8, wherein:
  when the first geofence is activated, the second geofence is deactivated; and
  when the second geofence is activated, the first geofence is deactivated.

10. The golf course traffic management system of claim 1, wherein the respective area includes an area where the plurality of golf vehicles leave a cart path to enter a fairway of a golf hole.

11. The golf course traffic management system of claim 10, wherein the respective area includes grass.

12. The golf course traffic management system of claim 1, wherein the one or more processing circuits are configured to provide an indication to an operator of the respective golf vehicle when the location indicates that the respective golf vehicle is located near or in the restricted operation area.

13. The golf course traffic management system of claim 12, wherein the indication includes at least one of a visual warning, an audible warning, or a tactile warning.

14. The golf course traffic management system of claim 1, wherein limiting operation of the respective golf vehicle includes at least one of limiting operation of a prime mover of the respective golf vehicle or limiting a direction of travel of the respective golf vehicle.

15. The golf course traffic management system of claim 1, wherein each of the plurality of golf vehicles is one of a golf cart, an all-terrain vehicle, a utility task vehicle, a low speed vehicle, a lightweight or recreational vehicle, a lawnmower, a turf mower, a push mower, a ride-on mower, a stand-on mower, an aerator, a turf sprayer, or a bunker rake.

16. The golf course traffic management system of claim 1, wherein the one or more processing circuits include at least one of (i) a first processing circuit located on the respective golf vehicle or (ii) a second processing circuit located remote from the respective golf vehicle.

17. A golf course traffic management system comprising:
  one or more processing circuits configured to:
    monitor a location of a plurality of golf vehicles relative to a respective area;
    store location data associated with the location of the plurality of golf vehicles;
    determine, based on the location data, a traffic concentration value associated with the respective area;
    establish a restricted operation area around the respective area responsive to the traffic concentration value exceeding a traffic concentration value threshold;
    permit unrestricted operation of a respective golf vehicle when the location indicates that the respective golf vehicle is located outside of the restricted operation area; and
    limit operation of the respective golf vehicle when the location indicates that the respective golf vehicle is located in the restricted operation area.

18. The golf course traffic management system of claim 17, wherein the traffic concentration value includes a predetermined number of instances the plurality of golf vehicles have operated in the respective area within a predetermined amount of time.

19. A golf course traffic management system comprising:
  one or more processing circuits configured to:
    establish a restricted operation area around a first area or a second area of a respective area;
    monitor a location of a golf vehicle relative to the respective area;
    permit unrestricted operation of the golf vehicle of the when the location indicates that the golf vehicle is located outside of the restricted operation area;
    limit operation of the golf vehicle when the location indicates that the golf vehicle is located in the restricted operation area; and
    automatically transition between establishing the restricted operation area around the first area and around the second area responsive to an elapsed time exceeding an elapsed time threshold to dynamically adjust a traffic pattern within the respective area.

20. The golf course traffic management system of claim 19, wherein the respective area includes the first area is defined by a first geofence, and wherein the one or more processing circuits are configured to automatically transition between establishing the restricted operation area around the first area and around the second area defined by a second geofence by activating the second geofence and deactivating the first geofence responsive to the elapsed time exceeding the elapsed time threshold.

* * * * *